March 5, 1946.  C. KALLUSCH  2,395,828

PHOTOGRAPHIC ROLL FILM CAMERA

Filed Oct. 27, 1941.  2 Sheets-Sheet 1

INVENTOR
Camillo Kallusch
BY
E. F. Wunderoth
ATTORNEY

March 5, 1946.  C. KALLUSCH  2,395,828
PHOTOGRAPHIC ROLL FILM CAMERA
Filed Oct. 27, 1941  2 Sheets-Sheet 2

INVENTOR
Camillo Kallusch
By
ATTORNEY

Patented Mar. 5, 1946

2,395,828

UNITED STATES PATENT OFFICE 2,395,828

PHOTOGRAPHIC ROLL FILM CAMERA

Camillo Kallusch, Prerau, Moravia; vested in the Alien Property Custodian

Application October 27, 1941, Serial No. 416,732
In Bohemia and Moravia June 15, 1940

11 Claims. (Cl. 95—31)

The present invention relates to a photographic roll film camera with a shutter for any time of exposure and a winding up spool for film, both to be operated by hand. The aim of this invention is to produce a photographic camera of small dimensions, the operating and shutter control devices thereof being of a simple construction which may be easily contained in a very small space without impeding the handling and the access to these devices which are so strongly constructed that they cannot be easily damaged.

The qualities required by such a miniature photographic camera are met by an arrangement in which, according to the present invention, the camera is equipped with a single slidable operating device, which when moved in one direction puts the mechanism for advancing and for winding up the film, the counter of pictures and the shutter mechanism into action, and when moved in the opposite direction controls the releasing of the mechanism of the shutter. The movement of the actioning device during which the advance and the winding up of the film and the tensioning of the mechanism of the shutter takes place is necessarily done during the operation in one direction of the device by hand, whereas the backward movement of the operating device and the movement of releasing the mechanism of the shutter takes place automatically by means of springs which have been put in tension during the first movement. According to a further feature of this invention the mechanism of the shutter consists in a movable slider pressed by a spring and locking levers controlling this slider. One advantage of this construction is that because of the sliding movements executed by the devices, these devices may be constructed flat so as to use advantageously the space of the camera. Finally there is a considerable advantage in the arrangement because its handling is very simple for to execute all functions only one handle is used.

An embodiment of a photographic roll film camera is illustrated by way of example in the accompanying drawings.

Figure 6:
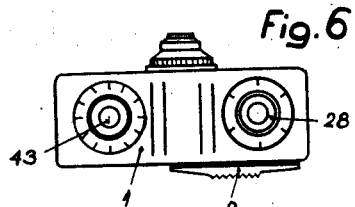
Fig. 6 shows diagrammatically a top view of the whole camera.
Figure 7:
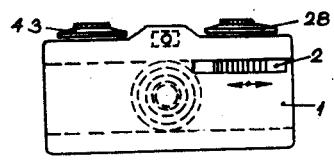
Fig. 7 is an end view of the same.

I is the casing of the camera (Figs. 6 and 7), 3 is the movable operating slider placed by means of the guide 4 (Figs. 3 and 4) on the transverse wall I'. To the slider 3 is fixed a handle 2 which is provided with a roughened surface or notches. The handle 2 is arranged movably on the outer wall of the casing I. The operating slider 3 has a rack 5 and a nose 6 provided with surfaces working together with the stop pawls of the locking levers to control the movements of the slider 31. These surfaces 7 and 7' are formed by slanting the edge of the nose 6 and by the slanting wall of the recess 6' in the nose 6. In this manner surfaces 7, 7' are arranged in unequal heights.

The rack 5 of the slider 3 engages into a toothed wheel 8 freely rotatable on the shaft 9 supported in a bore of the transverse wall I'. The position of the toothed wheel 8 is fixed by means of a stop pawl 10 which pivots about the pin 11 and is engaged by a spring 12. The pin of the stop pawl 10 is arranged on a disk 13, which is fixed to the shaft 9, the end 9' of which is split and forms part of a friction coupling for the winding spool 14 for the film 15.

To the slider 3 is pivoted by means of the pin 16 a clip lever 17, which is pressed by means of a spring 18 into a position in which the clip tooth 19 of the lever engages in the opening of the perforated film 15 which is wound off the film cartridge 61.

Figure 4:
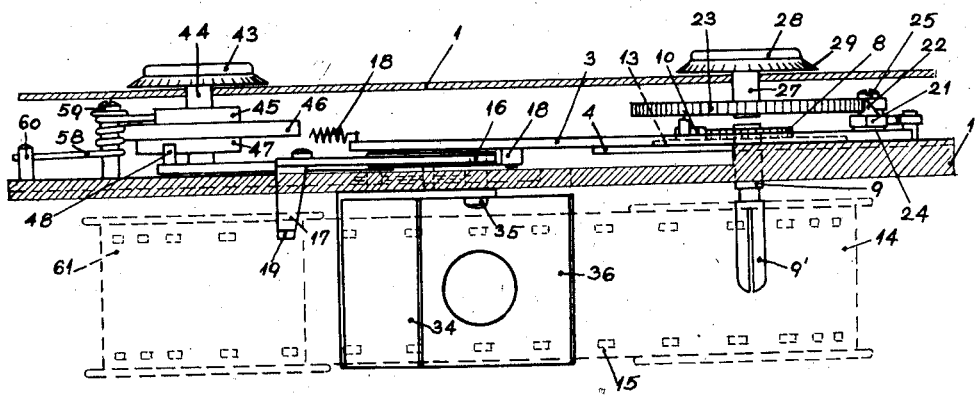
Fig. 4 is a transverse section along the line A—A in Fig. 3.
Figure 5:
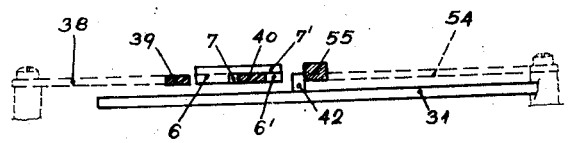
Fig. 5 shows diagrammatically and in part section the shutter controlling slider with the stop pawls of the locking levers.

On the slider 3 is also arranged a pin 20, which when handle 2 moves the slider 3 in one direction, touches the one end of a lever 21 having a tooth 22 engaging into the teeth of a wheel 23. This toothed wheel 23 is keyed on a shaft 27 which is pivoted in the wall of the casing of the camera I, (Fig. 4). This shaft 27 is provided with a knob 28 bearing a scale 29 and thus forms an exposure counter. The locking lever 21 pivots about a pin 24 in the wall of the casing of the camera. To the second arm of the locking lever 21 is fixed by means of a pin 25 a stop pawl 26 which is pressed by a spring (not shown) into engagement with the toothed wheel 23. The knob 28 of the counter is normally, when the camera is not used, secured against revolution by the tooth 22, which engages into the toothed wheel 23.

The mechanism of the shutter consists of a control slider 31, arranged so that it may be shifted, the pin 30 of which coacts with the nose 6 of the slider 3. To the slider 31 is fixed a spring plate 32, the free end of which is bent upwardly of the slider 31. The spring 32 has a slanting edge 32b, which during the movement of the slider 31 in one direction coacts with the pin 33, which is fixed to a shutter 34 bent into an angular shape, which pivots about a pin 35 and is shifted adjacent a screen plate 36.

To the wall of the casing of the camera 1 are pivoted two locking levers 38 and 54 of which the lever 38 is for snapshots and pivots about the pin 37. This lever pressed by a spring 41 bears an extension 39 and a pawl 40 coacting with the surface 7 and the nose 6 of the operating slider 3. The second locking lever 54 is used for time-exposures. This lever is pressed by a plate spring 57 and pivots about a pin 56. The stop pawl 55 of the locking lever 54 is higher than the stop pawl 40 and coacts with the surface 7' of the nose 6 and with the pin 42 in the locking position. 38' and 54' are stop pins limiting the swivelling of the levers 38 and 54.

The type of exposure is determined by a system of cams 45, 46, 47 which are keyed on a common shaft 44 and are actioned by a knob 43. The cam 47 engages with a pin 48 which is arranged on a double lever 49 moving around a pin 50 on the second arm of which is fixed a pin 51 on which presses the one end of a spring 52. The other end of this spring 52 presses against a pin x which is fixed to the shutter 34. A pin 53 which is arranged on the locking lever 54 for time-exposure coacts with cam 46. The slider 31 is biased by a spring 58 fixed to a pin 59 on the casing of the camera, one end of the spring 58 engaging a pin 60, which is arranged on the slider 31, whilst the other end engages the cam 45 by the rotation of which the tension of the spring 58 is adjusted.

Figure 1:
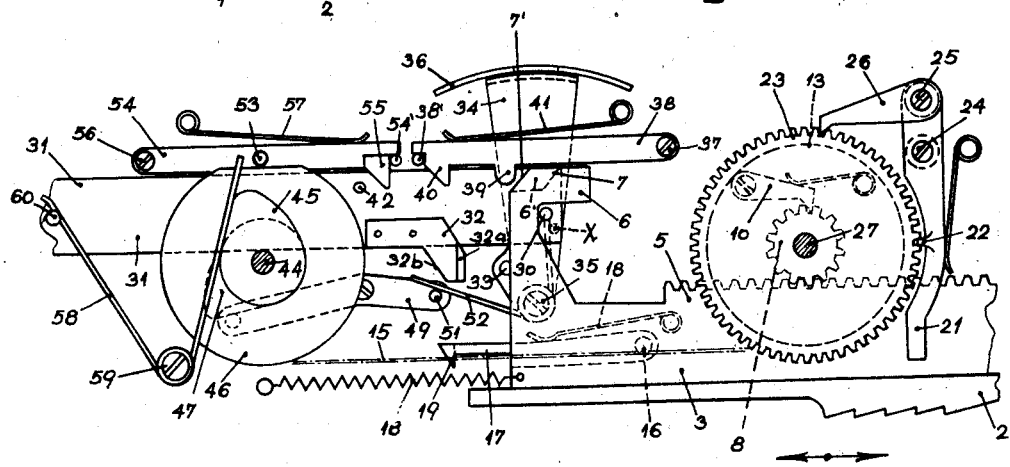
Fig. 1 is the top view of the principal mechanism taken out of the camera in a position in which the system of levers is set on "time" and the operating slider has been partly moved from its normal position.

The operation of the mechanism in adjusting and releasing the shutter and in winding up the film is as follows:

Handle 2 when displaced to the right (Fig. 1) at the same time also displaces the slider 3 and the rack 5, by which the toothed wheel 8 is turned carrying along the stop pawl 10 and the disk 12 mounted on the shaft 9. This occasions a revolution of the winding up spool 14 and the winding off film cartridge 61 and the film is advanced by the length of one picture field. The exact advancing of the film is secured by the clip lever 17, the stop pawl 19 of which enters the perforation of the film 15. Towards the end of the movement of the slider 3 (Fig. 2), its pin 20 engages the end of the lever 21 and swivels it in such a manner that the tooth 22 is disengaged from the wheel 23 and this toothed wheel is thus set free. By means of the stop pawl 26, the wheel 23 makes a partial revolution corresponding to the angle of one picture so that the scale 29 of the knob 28, which forms the counter of exposures advances by one number.

Figure 2:
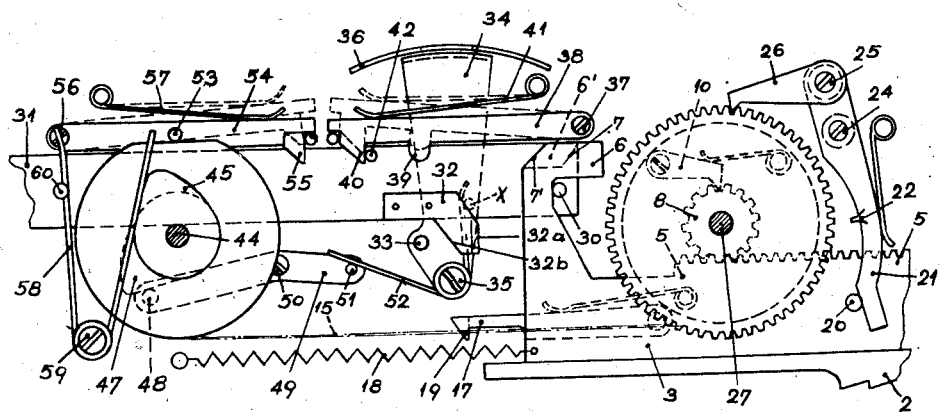
Fig. 2 shows the same view of the same mechanism as in Fig. 1 but with the operating slider in the final position after the film has been moved by one picture field.

When slider 3 is displaced into the position shown in Fig. 2 the slider 31 is also displaced into the right final position and both locking levers 54 and 38 swivel under the action of the springs 57 and 41 as their extensions become disengaged from the nose 6 of the steering slider 3, and its surfaces 7, 7'.

During this movement of the slider 31, the plate spring 32 passes over the pin 33 of the shutter 34 on account of the bent up offset part 32a, which acts as a cam surface, so that after the displacement of the slider 31 is completed the pin 33 is on that side of the spring 32 on which is the slanting edge 32b.

Figure 3:
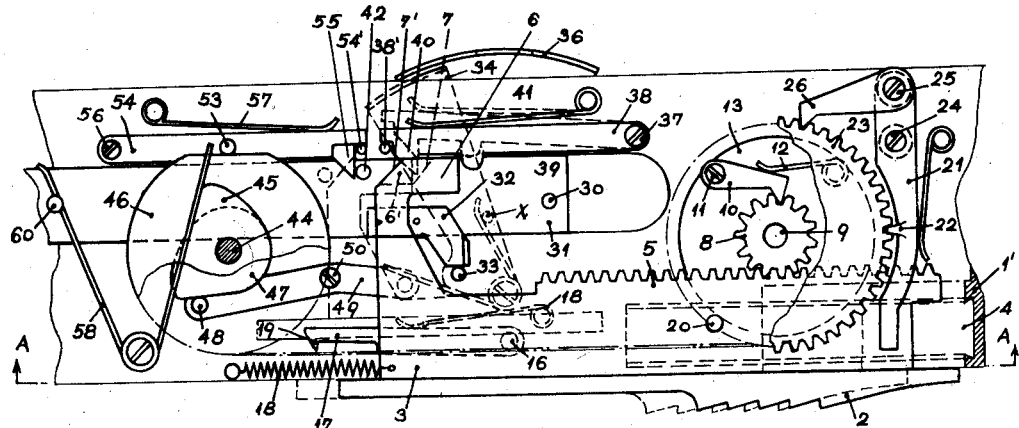
Fig. 3 shows a partial longitudinal section of the same mechanism as the preceding figures but with the operating slider released to its normal position.

Upon releasing the handle 2, the slider 3 moves in the opposite direction under the influence of the spring 18 until it assumes its normal position shown in Fig. 3. During such movement of the slider 3 to the left, the cam surface 7 on the nose 6 engages the extension 39 of the locking lever 38 causing the lever 38 to pivot to thereby remove its stop pawl 40 from engagement with the pin 42 of slider 31. When this occurs, the slider 31 is urged to the left by spring 58 until pin 42 engages the stop pawl 55 of the lever 54 as shown in Fig. 3. During the latter movement, the edge 32b of the plate spring 32 strikes the pin 33 on the shutter 34 and moves the latter to open position.

As the cam system 45, 46, 47 may also be set on "time" the shutter 34 remains open during the time the pin 42 touches the stop pawl 55. When it is desired the shutter be closed, then passing the slider 3 (by pressure of hand) constrainedly by means of the handle into the position marked by a dotted line (Fig. 3), in which the slanting steering surface 7' of the nose 6 strikes the stop pawl 55 of the locking lever 54, swivels it so that the slider 31 can return to the position indicated in Fig. 1 and the shutter 34 actioned by the spring 52 in tension returns to the closing position. The time of exposure may also be regulated by the speed of the movement of releasing of the slider 31.

If the knob 43 is set on snapshots the cam 46 raises the lever 54 in such a manner that its stop pawl 55 passes from the backward path of the pin 42 of the slider 31 (marked by a dotted line in Fig. 2). The movement of slider 31 to the right is the same as before, i. e. the pin 33 of the shutter 34 passes under the plate spring 32 and the stop pawl 40 of the locking lever 38 catches the pin 42, by which both parts 31 and 38 are locked. At the backward releasing movement of the slider 3 surface 7 of the nose 6 strikes the extension 39 of the locking lever 38, slider 31 is disengaged and by the action of the springs 58 and 52 in tension it is returned to the left and swivels at the same time the shutter 34, for the pin 33 follows the slanting edge 32b of the spring 32, so that the shutter can easily execute the exposure.

The roll-film camera shown and described is merely an example and its details may be differently altered without passing the limit of the invention. It is an object of this invention to employ for instance a blade shutter, a focal plane shutter and so on.

What I claim is:

1. In a roll-film camera, a shutter, a film winding means, a first slide and a second slide, a spring for biasing said second slide to a normal position, first means on said first slide for operating said film winding means when said first slide is moved in one direction, second means on said first slide for moving said second slide to a second position against the bias of said spring when said first slide is moved in said one direction, a latch for holding said second slide in said second position, means on said second slide for actuating said shutter to expose the film as said second slide returns to its normal position, and means on said first slide for tripping said latch when said first slide is moved in the opposite direction.

2. In a roll-film camera, a shutter, biasing means for normally holding said shutter closed, a first slide and a second slide, a spring for biasing said second slide to a normal position, means on said first slide for moving said second slide to a second position against the bias of said spring when said first slide is moved in one direction, a first latch for holding said second slide in said second position, means on said second slide for actuating the shutter to open position and then releasing it to its closed position as said second slide returns to its normal position, a second latch for engaging said second slide at a position wherein the shutter is maintained open, and means on said first slide for sequentially tripping said latches when said first slide is moved in the opposite direction.

3. The combination of claim 2 including means adjustable to render said second latch inoperative to engage said second slide.

4. The combination of claim 2 including means adjustable to render said second latch inoperative to engage said second slide, and means carried by said adjustable means for simultaneously increasing the bias of said spring.

5. The combination of claim 2 including means adjustable to render said second latch inoperative to engage said second slide, and means carried by said adjustable means for simultaneously increasing the bias of said spring and said shutter biasing means.

6. In a roll-film camera a shutter, biasing means for normally holding said shutter closed, a film winding means, a first slide and a second slide, a spring for biasing said second slide to a normal position, first means on said first slide for operating said film winding means when said first slide is moved in one direction, second means on said first slide for moving said second slide to a second position against the bias of said spring when said first slide is moved in said one direction, a first latch for holding said second slide in said second position, means on said second slide for actuating the shutter to open position and then releasing it to its closed position as said second slide returns to its normal position, a second latch for engaging said second slide at a position wherein the shutter is maintained open, and means on said first slide for sequentially tripping said latches when said first slide is moved in the opposite direction.

7. The combination of claim 6 including means adjustable to render said second latch inoperative to engage said second slide.

8. The combination of claim 6 including an adjustable shaft, a plurality of cams on said shaft, one of said cams coacting with said second latch to render it inoperative to engage said second slide, and another of said cams coacting with said spring to simultaneously increase the bias thereof.

9. In a roll-film camera, a shutter, biasing means for normally holding said shutter closed, a film winding means, an exposure counter comprising a toothed wheel and a pawl in engagement therewith, a first slide and a second slide, a spring for biasing said second slide to a normal position, first means on said first slide for operating said film winding means when said first slide is moved in one direction, second means on said first slide for moving said second slide to a second position against the bias of said spring when said first slide is moved in said one direction, a pin on said first slide for operating said pawl to actuate said toothed wheel when said first slide is moved in said one direction, a first latch for holding said second slide in said second position, means on said second slide for actuating the shutter to open position and then releasing it to its closed position as said second slide returns to its normal position, a second latch for engaging said second slide at a position wherein the shutter is maintained open, and means on said first slide for sequentially tripping said latches when said first slide is moved in the opposite direction.

10. The combination of claim 9 including means adjustable to render said second latch inoperative to engage said second slide.

11. The combination of claim 9 including an adjustable shaft, a plurality of cams on said shaft, one of said cams coacting with said second latch to render it inoperative to engage said second slide, and another of said cams coacting with said spring to simultaneously increase the bias thereof.

CAMILLO KALLUSCH.